United States Patent [19]

Pagano

[11] 4,320,949
[45] Mar. 23, 1982

[54] WEATHERIZED HOUSING ASSEMBLY FOR CAMERA

[76] Inventor: Raymond V. Pagano, 2734 Penwood Pl., Lithonia, Ga. 30058

[21] Appl. No.: 71,933

[22] Filed: Sep. 4, 1979

Related U.S. Application Data

[63] Continuation-in-part of Ser. No. 663,558, Mar. 3, 1976, abandoned, and a continuation of Ser. No. 883,143, Mar. 8, 1978, abandoned.

[51] Int. Cl.³ .................. G03B 37/02; G03B 29/00; H04N 5/26
[52] U.S. Cl. .................................. 354/81; 362/363; 358/108
[58] Field of Search ................. 354/74, 81, 82, 288, 354/293, 286; 362/66, 363, 373, 431, 294; 178/DIG. 38

[56] References Cited

U.S. PATENT DOCUMENTS

| | | | |
|---|---|---|---|
| 1,641,301 | 9/1927 | Sperry | 362/294 X |
| 2,137,026 | 11/1938 | Phillips | 362/363 X |
| 2,442,913 | 6/1948 | Abrams et al. | 354/74 X |
| 2,609,483 | 9/1952 | Roberts | 362/294 X |
| 2,643,581 | 6/1953 | Wehrenfennig | 354/286 |
| 2,839,668 | 6/1958 | Mills | 354/293 X |
| 3,164,838 | 1/1965 | Heinrich | 354/293 X |
| 3,253,139 | 5/1966 | Anderson | 362/294 X |
| 3,732,368 | 5/1973 | Mahlab | 178/DIG. 38 X |
| 3,739,703 | 6/1973 | Behles | 354/81 |
| 3,819,856 | 6/1974 | Pearl et al. | 354/81 X |
| 4,063,258 | 12/1977 | Allen | 354/81 |

FOREIGN PATENT DOCUMENTS

630977 10/1949 United Kingdom ................ 362/363

*Primary Examiner*—Donald A. Griffin
*Attorney, Agent, or Firm*—Newton, Hopkins & Ormsby

[57] ABSTRACT

A weatherproof housing assembly for a surveillance camera. The housing has a cover with a skirt over which rainwater may flow, form pendant drops, and fall, and a camera mount adapted to carry a camera and a camera positioning motor. A dome unidirectionally transparent to light is secured to the cover.

29 Claims, 5 Drawing Figures

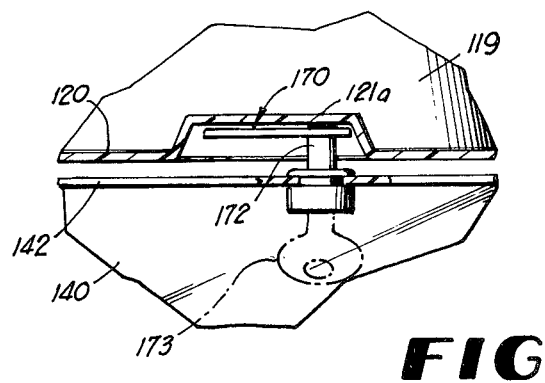
FIG 3
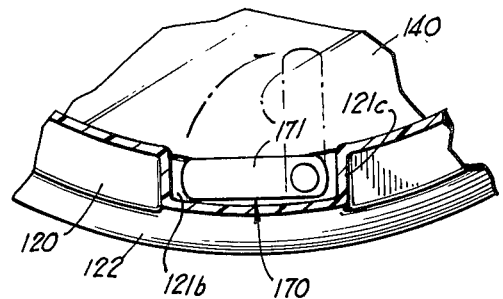
FIG 4
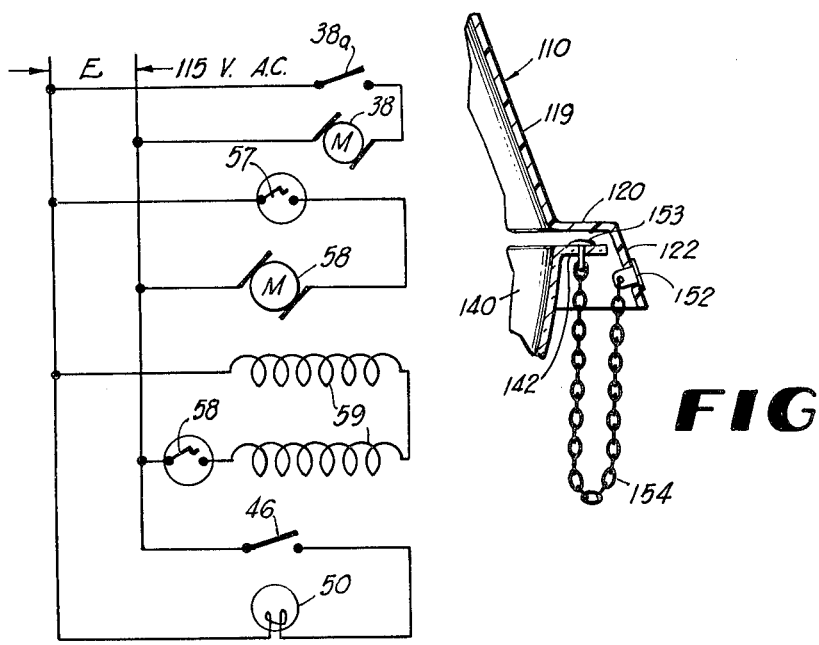
FIG 5
FIG 6

WEATHERIZED HOUSING ASSEMBLY FOR CAMERA

CROSS REFERENCE TO RELATED APPLICATIONS

This is a continuation-in-part of my co-pending application Ser. No. 663,558, filed Mar. 3, 1976, entitled WEATHERIZED HOUSING ASSEMBLY FOR CAMERA, now abandoned and a continuation of application Ser. No. 883,143, filed Mar. 3, 1978, now abandoned.

BACKGROUND OF THE INVENTION

This invention relates generally to camera housings, and particularly to an improved weatherized housing assembly for a surveillance camera.

Today, security is an ever present problem in business establishments. In retail stores, for example, shoplifting is of constant concern. In banks, robbery is an all to frequent occurrence. As a means for discouraging these activities cameras have recently been installed within such establishments to maintain public areas continuously under surveillance. Typically, these cameras either permanently record the scene in view on film or relay an image thereof to a display monitor such as a cathode ray tube observable by a security agent. The cameras are driven by electric motors so as to scan the entire area under surveillance. These motor typically rotate the camera about a generally vertical axis as well as about a generally horizontal axis in order to completely cover the area under surveillance.

In outdoor installations the equipment just described has traditionally been enclosed in metal housings. The housing is typically constructed from metal components and rotated on top of and by specially constructed heavy duty, weatherized drive motor. From a servicing standpoint the conventional means is very costly due to:

1. Weathering factor on exposed components and video cable which relays image to display monitors.
2. High wind resistance is experienced causing the housing to rock back and forth on the drive motor and eventually wear out the internal gears.
3. The load factor is considerable, since in the above example the drive motor must lift the camera, lens and metal housing along with ice and snow in subtropical climates.
4. Security personnel operating equipment with remote controls can point the camera skyward and burn the sensitive tube of the camera.
5. Fogging occurs within the housing preventing a visible picture.

In attempting to rectify the above short comings experienced with this type of conventional equipment, larger and more costly drive motors and non-burning cameras have been developed by the industry.

In indoor installations surveillance cameras of the type described have recently been enclosed within a dome through which light may enter but through which light may not exit. This type dome is typically constructed with a coating on the inner surface thereof of chromium which renders the dome transparent from its darker interior and substantially opaque or reflective from the lighter exterior. As a result, people within the area under surveillance are unable at any one time to determine whether or not the camera is directed towards them and observing their activities.

As exemplified by that disclosed in U.S. Pat. No. 3,819,856, housings for surveillance cameras have typically comprised a flat, disc shaped roof adapted to be mounted to a generally planar ceiling from which a concaved conical side cover depends. Mounted to the bottom of the side cover is a hemispherical, hollow dome. The camera drive motor is mounted to the roof and the camera itself mounted beneath the drive means within the bounds of the dome.

Though the just described housings have functioned well when shielded from weather conditions, they have failed to function satisfactorily when mounted for exterior surveillance. For example, the housing in the just described patent permits rainwater to run down the conical side of the housing and onto the dome itself. This causes the view through the dome to be severely obscured by the flow of water. In addition, the electrical wiring for supplying power and control signals to the camera motor has been merely passed through an opening in the disc shaped housing roofs. Should water be able to enter into the housing itself, it will accumulate within the dome and flood the camera. To prevent this from occurring, it has been necessary to pack the area where the electrical conduits have entered the disc shaped roof with sealing material which procedure has not been reliable. Furthermore, such attempts at converting the housing to exterior use have often required the use of encapsulated motors that are relatively expensive. The wiring within the housing has also had to have exterior insulation resulting in further costs.

Accordingly, it is a general object of the present invention to provide a weatherized housing assembly for a surveillance camera which is successful in reducing the cost of servicing and related equipment such as drive motors cited above.

Another object of the present invention is to provide a weatherized housing assembly for a camera which eliminated the weight of ice and snow on the drive motors.

Another object of the present invention is to provide a weatherized housing assembly for a camera which prevents the user from pointing the camera skyward into the rays of the sun.

Another object of the present invention is to provide a weatherized housing assembly for a camera which eliminates the wind resistance and wind load on a turning drive motor.

Another object of the present invention is to provide a weatherized housing assembly for a camera which will remain stable when high winds are experienced.

More specifically, it is an object of the invention to provide a weatherized housing assembly for a surveillance camera that eliminates the need for camera motors to be contained within weatherized casings.

Another object of the invention is to provide a weatherized housing assembly for a surveillance camera which prevents rainwater from flowing over a dome or window placed about the camera.

Another object of the invention is to provide a weatherized housing assembly for a surveillance camera of the type described which is easily installed to an extrinsic support.

Another object of the present invention is to provide a weatherized housing for a surveillance camera in which appreciable fogging of the lens and cover is eliminated.

Another object of the invention is to provide a weatherized housing for a surveillance camera of the type described which includes means for easily installing an auxiliary strobe light housing to the camera housing.

Another object of the present invention is to provide a weatherized housing for surveillance camera in which the various moving parts will not freeze.

Another object of the present invention is to provide a weatherized housing assembly for a camera which is inexpensive to manufacture, durable in structure and efficient in operation.

Another object of the present invention is to provide a weatherized housing assembly for a surveillance camera which will give an alarm, if tampered with.

Other objects features and advantages of the present invention will become apparent from the following description when considered in conjunction with the accompanying drawings, wherein like characters of reference designate corresponding parts throughout the several views.

SUMMARY OF THE INVENTION

In one form of the invention, a downwardly flowing frusto conical housing carries a hemispherical dome which is transparent to light in one direction. The housing is supported by a hollow support arm. A fan controlled by a thermostat circulates air to a camera and its motorized support within the interior of the dome and housing. A heater also controlled by a thermostat prevents freezing of the moving parts. The dome is removable from the housing, a tamper circuit indicating when the dome is removed. A single group of bolts secure the support arm, housing and motorized mount together. In another embodiment the dome is locked in place and there is a natural circulation of air.

BRIEF DESCRIPTION OF THE DRAWING

FIG. 3 is an enlarged vertical sectional view taken substantially along line 3—3 in FIG. 2.

FIG. 4 is an enlarged horizontal sectional view taken substantially along line 4—4 in FIG. 2;

FIG. 5 is an enlarged vertical sectional view taken substantially along line 505 in FIG. 2; and FIG. 6 is an electrical wiring diagram of the circuitry of the housing assembly of FIG. 1.

DETAILED DESCRIPTION OF THE EMBODIMENT

Figure 1:
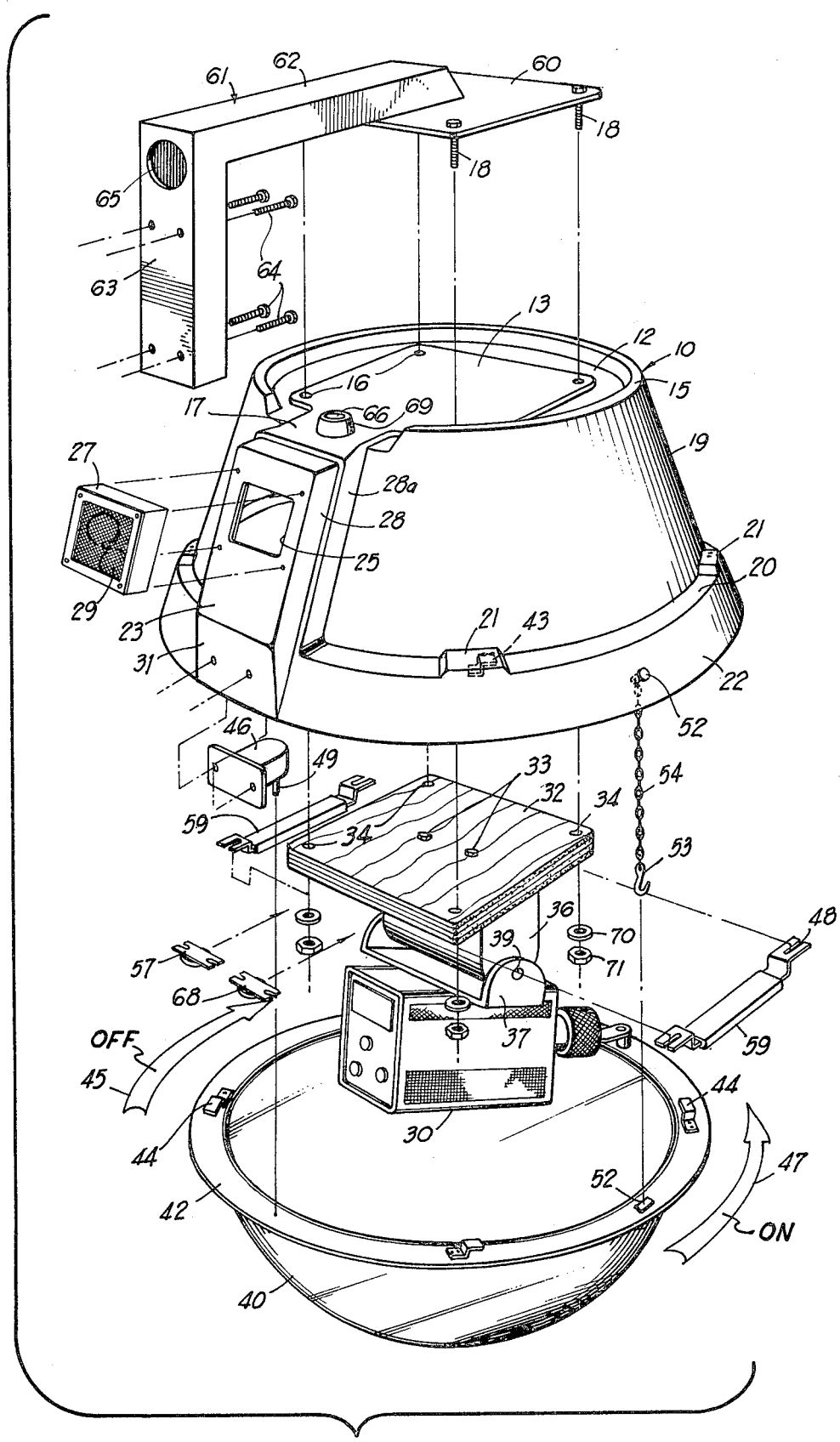
FIG. 1 is an exploded view in perspective of a weatherized housing assembly and a surveillance camera embodying principles of the invention in one preferred form.

Referring now in detail to the embodiment chosen for the purpose of illustrating the present invention, numeral 10 denotes generally a unitary plastic molded opaque housing or cover which is generally in the form of a frusto-conical inverted cup. In more detail, the housing has generally flat top 12 with a raised square or rectangular central portion 13. The corners of the central portion 13 are provided with holes or apertures 16 through which the fastening means, such as bolts 18, project. The top 12 is provided with a peripheral upstanding rim, a portion of which is interrupted so that the extension 17 of the flat central portion 13 can project rearwardly and outwardly of the top 12 as best seen in FIG. 1.

The rim is provided with a flat outwardly extending annular upper edge 15 which merges with the upper edge portion of the downwardly projecting frusto-conical side walls 19. Projecting outwardly from the lower edge of side wall 19 is a ledge or annular flange 20, provided along its outer periphery with a frusto-conical downwardly diverging skirt 22 which is offset outwardly of the wall 19 and is tapered upwardly at approximately the same angle as the wall 19. Circumferentially spaced portions of the ledge 20 are offset upwardly to provide latch receiving recess members 21. Ledge or flange 20 is disposed in a lateral or horizontal plane which is perpendicular to the certical or major axis of housing or cover 10.

At the rear of the housing 10 is a flat rectangular fan receiving plate 23 which is provided with a rectangular or square opening 25 over which is secured a fan housing 27 containing a fan 29. The plate 23 is supported by side walls 28 the inner edges of which connect to side walls 28a. The side walls 28 are vertically disposed and parallel to each other as are the side walls 28a. The lower ends of the side walls 28a merge with the flange or ledge 20, as seen in FIG. 1, while the upper edges of the side walls 28a merge with the plate 17. The side walls 28 and 28a space the fan housing 27 rearwardly of the side wall 19, as seen in FIG. 1. A connecting bottom plate 31 is intergrally joined to the mounting plate 23, the plate 31 forming a base for the mounting of tamper switch 46 which has switch arm 49.

It will be understood that the housing or casing 10 is an inverted disc shaped member which is moulded as a unitary structure, the thickness of which is substantially uniform throughout. Thus, it has a downwardly opening interior adequate to receive a rectangular or square camera mount or mounting plate or base 32. The corner portions of base 32 are provided with holes 34 which are in alignment, respectively, with the holes 16. Bolts 33 in the central portion of the plate 32 mount for rotation about a vertical axis a camera mounting and rotating member 36. This camera mounting and rotating member 36 carries a bracket 37 which, in turn, carries the surveillance camera 30 as shown in FIG. 1. The function of the camera mounting and rotating member 36 is to rotate the surveillance camera 30 through a 360° arc through the operation of a camera positioning motor 38 shown in FIG. 6, upon closing of switch 38a. Motor 38 and switch 38a are in series across a source of current E. The switch 38a can be within the interior of the housing assembly or remote therefrom. The camera 30 is also tiltable about a horizontal axis defined by the pivot pin 39 so that the mechanism provides a means for moving the camera almost omnidirectionally. The camera cover or dome 40 has a concave inner surface which can, if desired, be coated with chromium or some other reflective material or one way viewing material which will conceal the presence of the camera 30 while, at the same time, permitting the lens of the camera 30 to view the area surrounding the assembly. The dome or cover 40 includes an annular outwardly flaring flange 42 along its upper edge. The flange 42 is disposed in a common radial plane with respect to the dome or cover 40 and is of an outside diameter slightly less than the outside diameter of the ledge 20 and an inside diameter slightly larger than the outside diameter of the ledge 20. Thus, the flange 42 is adapted to be received within the skirt 22 in abutting relationship to the radially disposed ledge or flange 20.

The upwardly recessed members 21 along the ledge 20 receive, respectively, Z-shaped latches 43 of the latch members. For cooperating with these Z-shaped latches 43, the upper surface of the flange 42 are provided with circumferentially spaced upstanding cooperating Z-shaped latches 44 of the latch members. The dimensions and positioning of the latches 43 and 44 are such that when the dome 40 is raised into its closed position so that the upper surface of the flange 42 abutts the lower surface of the ledge 20 and skirt 22 surrounds flange 42, the horizontally extending fingers of latches 43 and 44 are in opposed facing relationship and, therefore, by rotation in a clockwise direction as indicated by arrow 47, the fingers are brought into overlapping relationship so that dome 40 is locked in its seated position. By rotation in the direction indicated by the arrow 45, the dome 40 may be readily and easily removed.

A dome dismount sensing switch 46 mounted on the inside surface of the plate 31 by means of bolts (not shown) has a downwardly extending actuator arm or switch arm 49 which is depressed by the flange 42 when the dome 40 is brought into registry with the seat formed by the ledge 20. The depressing of this actuator arm 49 opens the normally closed switch 46 which is in series with a signal means such as an alarm light 50 across a source of current E in FIG. 6. The lamp or light 50 may be a bell or other mechanism to give either a visual or audible alarm when the dome 40 is tampered with. Light 50 is a strobe light preferably mounted on the external side of wall 19.

The annular flange 42 is provided with an riveted eyelet 52 which receives a hook 53 on the end of a chain 54, the other end of which is secured by an anchor 52 to the skirt 22. Thus, the hook 53 retains the dome 40 from dropping to the ground when it is released from the housing 10.

Within the interior of the housing 10 are a pair of electrical resistance heaters 59 the ends of which are offset and bifrocated so as to receive, within the outwardly opening slots 48, the bolts 18, as will be explained, hereinafter. The electrical resistance heaters 59 are electrically connected in series with each other and in series with a thermostatically controlled switch 68, across a source of 115 volts a.c. current. The thermostatic switch 68 is conveniently mounted on the lower surface of the plate 32. A second thermostatic switch 57 is also provided on the lower surface of the plate 32, this switch being electrically connected in series with a motor 29 which drives the fan 27. the thermostatic switch 57 and motor 29 are in series across the 115 volt a.c. source of current. Hence, when the temperature becomes too high so that there is danger of damaging the film or the tape which is in the camera 30 the fan 27 will be actuated so as to circulate air in the interior of the housing assembly. Conversely, when the temperature approaches freezing, the thermostatic switch 68 is closed to energize the heaters 59 so as to heat the air in the interior of the housing assembly.

Referring to the uppermost portion of FIG. 1, it is seen that the bolts 18 are carried by a common rectangular flat supporting plate 60 which is mounted on the end portion of a tubular laterally extending horizontal cantilever support arm 62. The outer end of arm 62 is closed. The other end of arm 62 is connected to the upper end of a tubular vertically disposed arm 63, the arms 62 and 63 forming an L shaped bracket 61. Bolts 64 which project through the vertical arm 63 are for mounting the bracket 61 against a suitable post, or the like. An exhaust port 65 is provided in the elbow of the bracket 61 so that air which is introduced into the interior of the housing assembly by means of the fan 27 will be exhausted through an exhaust port 66 of an upstanding nozzle 69 in the plate 13 and thence into the hollow interior of the horizontally disposed supporting arm 62. A hole (not shown) in arm 62 receives nozzle 69.

When the structure depicted in FIG. 1 is assembled, the plate 60, which is of approximately the same dimensions as the major portion of the plate 13, is brought into registry with the plate 13 so that the bolts 18 protrude through the holes 16 thereof. Also, the plate 32 is brought into registry with the lower surface of the plate 13 so that the bolts 18 project through the holes 34. Then the heaters 54 are placed on the bolts 18, the bolts projecting through the slots 48 thereof and the bolts thereafter, receive the washers 70 and the nuts 71. The dome 40 is then installed as described above. Hence, plates 60 and 32 sandwich portion 13 of top 12.

In the embodiment depicted in FIGS. 2-5, the structure is substantially identical to the assembly depicted in FIG. 1; however, there is a natural circulation of air, rather than a forced circulation. Hence, no fan is provided. The housing 110 is therefore identical to the housing 10, except that the opening 25 is closed. Furthermore, the dome 140 is identical to the dome 40 and the lock mechanism or latches 143, 144 are identical to the latches 43 and 44. Thus, the dome 140 has an annular flange 142 which is received within the skirt 122 in juxtaposition with the ledge or shoulder 120. Thus, the flange 142 depresses the actuator plunger or lever 149 on the switch 146 carried by the plate 131. The switch 146 is in series with the lamp 150, just as switch 46 is in series with lamp 50. The switch 146 is retained in place on the inside of the upstanding channel 125 by means of bolts 132.

The channel 125 provides an air passageway for air to be introduced upwardly as indicated by the arrows 160 and thence to pass downwardly over the inside of the dome as indicated by arrows 161. The air thus circulated thence passes upwardly as indicated by the arrows 162 and out of the opening 166 in the top plate 13, passing through an upstanding conduit or nozzle 169.

Figure 2:
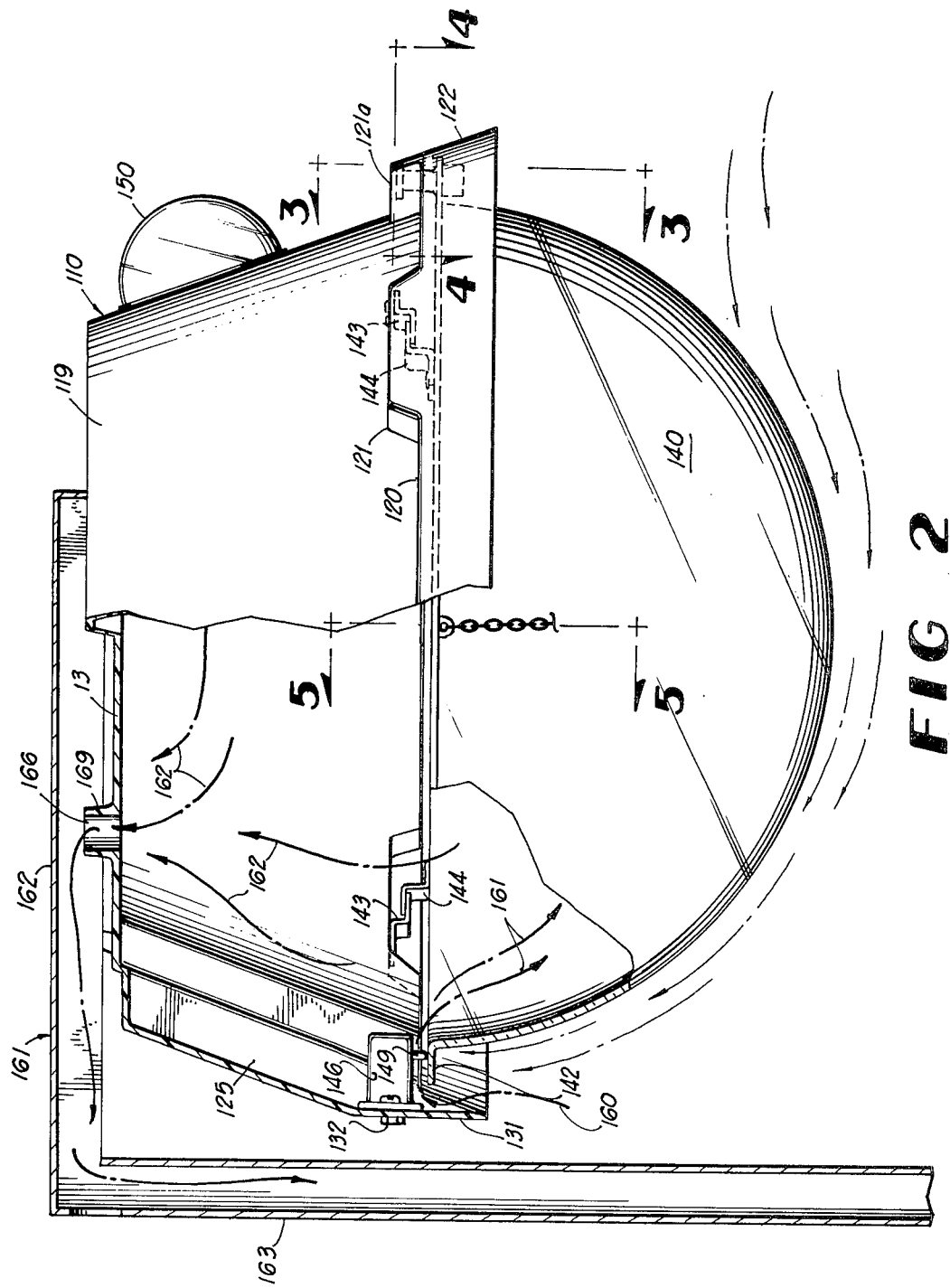
FIG. 2 is a side elevational view, partially broken away, of a modified form of weatherized housing assembly.

The bracket or horizontally disposed cantilever supported hollow downwardly opening rectangular support arm or brace 162 of the supporting L-shaped bracket 161 receives the conduit 169 therethrough so that the air which passes up through the opening 166, thence passes outwardly through the interior of the arm 162 and thence downwardly through the interior of the arm 163 which is secured, as shown in FIG. 2 to the end of the arm 162. The arm 163, like the arm 162 is a hollow rectangular tubular member which is vertically disposed and extends downwardly along the side of the housing assembly in spaced relationship to both the housing 110 and the dome 140.

There is a slight spacing of the annular flange 142 which respect to the shoulder or ledge 120 as best seen in FIG. 5 so as to permit air which passes around the air foil shape of the dome to be introduced and funneled into the interior by means of the skirt 122 and the ledge 120. The air foil shape of the dome and the skirt 122 also receives the air in a high wind and while funneling the same into the interior also provides a stabilizing upward force for the entire housing. The dome 140 is removed by rotation, as described for the embodiment of FIG. 1.

A chain 154, seen in FIG. 5 is anchored by means of an anchor 1-2 to the skirt 122. One end of the chain 154 is secured to this anchor 152 while the other end of the chain 152 is secured to a similar anchor 153 and rivited eyelet on the flange 142.

As seen in FIGS. 2, 3 and 4, the housing 110 includes an additional upstanding recess 121a which is similar to the recesses 121. This provides an upwardly spaced cavity 121b above the flange 142, when the dome 140 is installed. A detent or lock member 170 is provided for operation in the recess 121b. This detent 170 includes a laterally extending leaf 171 carried by a cylindrical lock element 172. The lock element 172 is mounted for rotation on the flange 142, only with a key 173 depicted in broken lines in FIG. 3. When the leaf 171 is rotated by the lock element 172 and the key 173 to the position shown in full lines in FIGS. 3 and 4, it fits within the recess 121b so that the end of the leaf or finger 171 terminates closely adjacent to or abutting the upstanding or inclined side shoulder 121c of the recess member 121a. In such a position, the leaf 171 prevents rotation of the dome 140 to its unlatched position. When, however, the key 173 rotates the lock element 172 so as to move the leaf 171 to the position shown in broken lines in FIG. 4, the leaf 171 is removed from its abutting relationship to the shoulder 121c and hence the dome 140 may be rotated sufficiently to be removed.

It will be obvious to those skilled in the art that many variations may be made in the embodiments here chosen for the purpose of illustrating the present invention and full result may be had to the doctrine of equivalents without departing from the scope of the present invention as defined by the appended claims.

I claim:

1. A weatherized housing assembly for a camera comprising, in combination, a laterally extending support, a cover having a flat cap carried by the end portion of said support, said cover also having an upwardly tapered skirt upon which rainwater may flow, form pendant drops and fall; a camera mount within said cover and adapted to carry said camera and a camera positioning motor; fastening means extending through said camera mount and said cap and said support for fastening said camera mount and said cap together and to said support, a dome substantially transparent to light in at least one direction therethrough; and latch means for securing said dome to said cover and surrounding said camera.

2. The weatherized housing assembly defined in claim 1 including electric resistance heater means disposed within said cover and thermostat means electrically connected to said heater means for energizing said heater means when the temperature drops to a prescribed level.

3. The weatherized housing assembly defined in claim 1 including a fan mounted on one side of said cover and thermostat means for controlling said fan, said fan being adapted to direct air into the interior of said cover.

4. The weatherized housing assembly defined in claim 1 including a heater means disposed within said housing and a fan mounted on said housing for directing air into the interior of said housing and thermostat means for controlling said heater means and said fan.

5. The weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support for fastening said camera mount and said cover together and to support, a dome substantially transparent to light in at least one direction therethrough; latch means for securing said dome to said cover and surrounding said camera; electric resistance heater means disposed within said cover and thermostat means electrically connected to said heater means for energizing said heater means when the temperature drops to a prescribed level; said heater means includes elongated members having aperture means at opposite ends thereof and wherein said fastening means also supports said elongated members.

6. The weatherized housing assembly defined in claim 5 wherein said thermostat means is mounted on said camera mount.

7. The weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support for fastening said camera mount and said cover together and to said support, a dome substantially transparent to light in at least one direction therethrough; latch means for securing said dome to said cover and surrounding said camera; a switch carried by said cover; a switch arm carried by said switch in a position to be contacted by said dome when said dome is installed on said cover; and alarm means electrically connected to said switch for indicating when said dome has been removed from said cover.

8. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover together and to said support, a dome substantially transparent to light in at least one direction therethrough; and latch means for securing said dome to said cover and surrounding said camera, said latch means including a plurality of opposed Z-shaped latches mounted respectively on the edge of said dome and said cover, said latches being adapted to be disposed adjacent to each other and rotated into overlapping relationship when said dome is installed on said cover, said latches supporting said dome from being removed except when said dome is rotated to an unlatched position.

9. The weatherized housing assembly defined in claim 8 including a lock having elements carried by said dome and said cover for preventing rotation of said dome with respect to said cover so as to lock the dome in its position mounted on said cover.

10. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support for fastening said camera mount and said cover together and to said support, a dome substantially transparent to light in at least one direction therethrough; and latch means for securing said dome to said cover and surrounding said camera, said cover including frusto-conical outwardly diverging side wall, an annular flange secured to the lower end of said side wall, said skirt being secured to the outer periphery of said annular flange, said annular flange providing a seat for the upper edge portion of said dome when said dome is installed on said cover.

11. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover together and to said support, a dome substantially transparent to light in at least one direction therethrough; and latch means for securing said dome to said cover and surrounding said camera, said laterally extending support including a flat plate, said fastening means including a plurality of spaced bolts extending through said flat plate and through the top portion of said cover, and through the edge portions of said camera mount for securing the same together so that said plate and said mount sandwich the top portion of said housing therebetween.

12. A weatherized housing assembly for a surveillance camera comprising in combination a unitary cover having a downwardly diverging frusto-conical wall, a flat top, and a an annular flange extending laterally outwardly from the lower end portion of said side wall, an outwardly and downwardly projecting skirt carried by the outer periphery of said annular flange, means within said housing for supporting a camera for surveillance, and a dome closing said cover, said dome having an annular flange which abuts the annular flange of said cover and means for securing the two annular flanges together.

13. The weatherized housing assembly defined in claim 12 including heater means within said housing and thermostat means for controlling said heater means.

14. The weatherized housing assembly defined in claim 12 including a fan carried by said cover for introducing air into the interior of said cover and wherein said cover includes a port for discharging the air introduced by said fan into the interior of said bracket from said cover.

15. The weatherized housing assembly defined in claim 12 including switch means for detecting when the aforesaid flanges are brought into abutting relationship and alarm means connected to said switch means and actuatable when said dome is removed from said cover.

16. The weatherized housing assembly defined in claim 15 wherein said alarm means is a strobe light.

17. The weatherized housing assembly defined in claim 12 wherein said dome is an upwardly opening hemispherical member and said skirt surrounds the upper portion of said dome and diverges downwardly and outwardly therefrom, said cover and said dome defining an air space therebetween, said dome forming an air foil for cooperating with said skirt in directing air upwardly between said skirt and said dome and through said opening into the interior of said cover.

18. Weatherproof housing assembly for a surveillance camera comprising, in combination, a support, a cover, having a skirt upon which rainwater may flow, form pendant drops and fall; a camera mount adapted to carry a camera and a camera positioning motor; fastening means for fastening said camera mount and said cover together and to said support; a dome substantially transparent to light in at least one direction thereof; means for securing said dome to said cover; and a mounting bracket to which said cover is secured, said cover for overlying said dome, a strobe light mounted on said cover and switch means for actuating said strobe light when said dome is removed from said cover.

19. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support for fastening said camera mount and said cover together and to said support, a dome substantially transparent to light in at least one direction therethrough; and latch means for securing said dome to said cover and surrounding said camera; said skirt being downwardly diverging and having a lower surface encompassing said dome in spaced relation therewith whereyb rainwater flowing onto the cover skirt is inhibited from flowing onto the dome.

20. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support for fastening said camera mount and said cover together and to said support, a dome substantially transparent to light in at least one direction therethrough; latch means for securing said dome to said cover and surrounding said camera; sensing means between said dome and said cover for actuating a signal in response to sensed dismounting of said dome from said cover.

21. A weatherized housing assembly for a surveillance camera comprising, in combination a bracket having bracket holes, a cover having a plurality of cover holes in an upper portion thereof adapted to receive fastening means therethrough; a camera mount adapted to carry a camera and camera positioning motor and having a plurality of openings in an upper portion thereof adapted to be placed in alignment with said cover openings; fastening means sized to pass through said bracket holes, said cover holes and said openings for fastening said camera mount and said cover together; a dome sized to be secured to said cover; and means for securing said dome to said cover; said cover having a skirt from the bottom of which rainwater forms pendant drops and falls; said dome being spaced from and within said skirt whereby rainwater does not flow thereonto.

22. A weatherized housing assembly for a surveillance camera in accordance with claim 21 wherein said means for securing said dome to said cover includes a plurality of spaced latches passing through said dome and said cover, said latches being simultaneously disengageable from said cover by rotation of said dome.

23. A weatherized housing assembly for a surveillance camera comprising, in combination, a laterally extending support, a cover carried by the end portion of said support, said cover having a skirt upon which rainwater may flow, form pendant drops and fall; a camera mount within said cover and adapted to carry said surveillance camera and a camera positioning motor; fastening means extending through said camera mount and said cover and said support and said support for fastening said camera mount and said cover together and to said support, a dome substantially transparent to light in at least one direction therethrough; and latch means for securing said dome to said cover and surrounding said camera, said dome is an upwardly opening hemispherical member and said skirt surrounds the upper portion of said dome and diverges downwardly and outwardly therefrom, said cover and said dome defining an air space therebetween, said dome forming an air foil for cooperating with said skirt in directing air upwardly between said skirt and said dome and through said opening into the interior of said cover.

24. A weatherized outdoor housing assembly for a camera of the type having a stationary cover essentially closed to the weather along its upper portion with an open bottom end, a camera adjacent to said cover, a downwardly protruding dome which is transparent in at least one direction, and across said open bottom end, said cover and said dome forming an essentially open interior for housing said camera, motor means for moving said camera within said housing, said camera having a lens adjacent to said dome for surveillance by said camera through said dome, the combination therewith wherein said dome is continuous along that portion thereof through which said lense functions, and comprising thermostatic means within the interior defined by said cover and said dome for detecting the temperature within said interior and temperature control means controlled by said thermostatic means for varying said temperature within said interior, adjacent portions of said cover and said dome being spaced apart to provide a first air opening therebetween, there being provided a second air opening in said cover in spaced relationship to said first air opening, said temperature control means being in the effective path of air between said first air opening and said second air opening for altering the condition of such air, said air circulating throughout the open interior.

25. The housing assembly defined in claim 24 wherein said control means is a heater disposed in said housing for heating the air in said interior.

26. The housing assembly defined in claim 25 wherein said control means also includes a fan mounted on said cover and adjacent to said second opening for urging air through said second opening when said fan is actuated.

27. Th housing defined in claim 26 wherein said thermostatic means includes a pair of thermostats, one controlling said fan and the other controlling said heater.

28. The housing assembly defined in claim 24 wherein said control means includes a fan mounted for directing air into said interior.

29. A housing assembly of the type having a cover, with an open bottom end, a camera, a dome across said open bottom end, said cover and said dome forming an essentially open interior for housing said camera, the combination therewith of thermostatic means within the interior defined by said cover and said dome for detecting the temperature within said interior and temperature control means controlled by said thermostatic means for varying said temperature within said interior, there being provided openings in sad housing in spaced relationship to each other, for the exchange of air between the interior and exterior of said assembly, one of said openings being in spaced relationship to said temperature control means, said air circulating throughout the open interior, said control means including a heater disposed in said housing for heating the air in said interior and a fan mounted on said cover, said cover having one of said openings adjacent to said fan through which air passes when said fan is actuated, said openings being respectively in said dome adjacent to said fan and adjacent to the junction of said dome and said cover.

* * * * *